US008326778B1

United States Patent
Lu et al.

(10) Patent No.: US 8,326,778 B1
(45) Date of Patent: Dec. 4, 2012

(54) SYSTEMS AND METHODS FOR GENERATING PREDICATES AND ASSERTIONS

(75) Inventors: Yuan Lu, San Jose, CA (US); Yunshan Zhu, Cupertino, CA (US)

(73) Assignee: NextOp Software, Inc., San Jose, CA (US)

(*) Notice: Subject to any disclaimer, the term of this patent is extended or adjusted under 35 U.S.C. 154(b) by 486 days.

(21) Appl. No.: 12/649,144

(22) Filed: Dec. 29, 2009

Related U.S. Application Data

(63) Continuation of application No. 12/634,586, filed on Dec. 9, 2009, now abandoned, which is a continuation-in-part of application No. 11/672,919, filed on Feb. 8, 2007, now Pat. No. 7,926,020.

(60) Provisional application No. 60/766,746, filed on Feb. 9, 2006.

(51) Int. Cl.
G06N 5/00 (2006.01)
(52) U.S. Cl. .......................... 706/12; 706/45
(58) Field of Classification Search .............. 706/12, 706/45
See application file for complete search history.

(56) References Cited

OTHER PUBLICATIONS

Katoen, Concepts, Algorithms, and Tools for Model Checking, Lecture Notes of the Course "Mechanised Validation of Parallel Systems", Friedrich-Alexander Universitat Erlangen-Nurnberg, 1999, pp. 1-292.*

Fraser, Automated Software Testing with Model Checkers, Dissertation, Graz University of Technology, Oct. 2007, pp. 1-239.*

Sloan, et al., On k-term DNF with the largest number of prime implicants, SIAM Journal on Discrete Mathematics, vol. 21 Issue 4, Jan. 2008, pp. 987-998.*

* cited by examiner

*Primary Examiner* — Wilbert L Starks
(74) *Attorney, Agent, or Firm* — Carr & Ferrell LLP

(57) ABSTRACT

Systems and methods for deriving a predicate by constructing a logic formula from information recorded during test execution, optimizing the logic formula and computing the logical implication of the optimized logic formula. Systems and methods for deriving an assertion from a logical implication by substituting each predicate in the logical implication with corresponding design elements from a hardware design description, inserting the design elements into a target template, inserting a context-sensitive input of the target template based on design elements in the hardware design description and creating an instance name for an instantiation of the target template. Systems and methods for generating a set of clauses that are implied by a disjunctive normal formula of a set of cubes.

29 Claims, 10 Drawing Sheets

INFORMATION
200

P0:   t=0: true,  t=1: false,  t=2: true,  t=3: false,  t=5: true, ...

P1:   t=0: false, t=1: true,  t=2: false, t=3: true,  t=5: false, ...

INFORMATION
210

| Time → | t=0 | 1 | 2 | 3 | 4 | 5 | ... |
|---|---|---|---|---|---|---|---|
| P0: | true | false | true | false | false | true | x |
| P1: | false | true | false | true | true | false | x |

INFORMATION
220

| Time → | t=0 | 1 | 2 | 3 | 4 | 5 | ... |
|---|---|---|---|---|---|---|---|
| P0: | 1 | 0 | 1 | 0 | 0 | 1 | x |
| P1: | 0 | 1 | 0 | 1 | 1 | 0 | x |

INFORMATION
300

| Time → | t=0 | 1 | 2 | 3 | 4 | 5 | ... |
|---|---|---|---|---|---|---|---|
| P0: | 1 | 0 | 1 | 0 | 0 | 1 | x |
| P1: | 0 | 1 | 0 | 1 | 1 | 0 | x |
| P2: | - | - | - | - | - | - | x |
| ... Pn | - | - | - | - | - | - | x |

FIGURE 3A

LOGIC FORMULA
310

$$( P0 \wedge \neg P1 \wedge f_{t=0}(P2..Pn) )$$
$$\vee \; (\neg P0 \wedge \; P1 \wedge f_{t=1}(P2..Pn) )$$
$$\vee \; ( P0 \wedge \neg P1 \wedge f_{t=2}(P2..Pn) )$$
$$\vee \; (\neg P0 \wedge \; P1 \wedge f_{t=3}(P2..Pn) )$$
$$\vee \; (\neg P0 \wedge \; P1 \wedge f_{t=4}(P2..Pn) )$$
$$\vee \; ( P0 \wedge \neg P1 \wedge f_{t=5}(P2..Pn) )$$
$$\vee \quad\quad \downarrow$$

FIGURE 3B

LOGIC FORMULA
320

$PX \;\; = ( P0 \wedge \neg P1 ) \vee (\neg P0 \wedge P1 )$
$\quad\quad = ( P0 \oplus P1 )$ , perform reverse substitution
$\quad\quad = (A > B) \oplus (C > D)$

```
START
  ↓
SUBSTITUTING EACH PREDICATE WITH DESIGN
ELEMENTS FROM HARDWARE DESIGN DESCRIPTION
710
  ↓
INSERTING DESIGN ELEMENTS INTO TEMPLATE
720
  ↓
INSERTING CONTEXT-SENSITIVE INPUTS INTO
TEMPLATE
730
  ↓
CREATING INSTANCE NAME FOR TEMPLATE
INSTANTIATION
740
  ↓
END
```

FIGURE 7

SYSTEMS AND METHODS FOR GENERATING PREDICATES AND ASSERTIONS

CROSS-REFERENCE TO RELATED APPLICATIONS

The present application is a continuation of U.S. patent application Ser. No. 12/634,586, filed Dec. 9, 2009, which is a continuation-in-part of U.S. patent application Ser. No. 11/672,919, filed Feb. 8, 2007, which claims the benefit of U.S. provisional patent application No. 60/766,746, filed Feb. 9, 2006. The disclosure of these applications is incorporated herein by reference.

BACKGROUND OF THE INVENTION

1. Field of the Invention

The present invention generally relates to electronic design automation. More specifically, the present invention relates to systems and methods for deriving predicates and assertions related to a digital hardware design.

2. Description of the Related Art

Today's hardware systems in general and integrated circuit devices in particular are commonly designed and verified through the use of an electronic design automation system. The design cycle typically involves iterative testing of a digital hardware design, represented by a hardware design description, to verify if the design operates as specified in the design specification. The electronic design automation system usually comprises a simulator or emulator (collectively referred to as simulator hereinafter) capable of loading a high level behavioral description of a digital hardware design (e.g. described in a hardware design language like Verilog). The design under test or device under test is sometimes referred to as DUT. The simulator is furthermore usually capable of loading a test that provides stimuli for inputs of the DUT. Finally, some module or entity is required to determine the result of the test. This module or entity could be an output checker, a rules monitor, a set of predicates, or any combination thereof.

FIG. 1A illustrates a typical test environment as used in an electronic design automation system. The entire test environment 100 can be modeled in computer memory and other devices. For example, various elements of this environment can be programmed into physical devices or components that interface with the simulator or emulator. For example, the DUT can be programmed into an FPGA. Additionally, the output can be visualized on a display device, and the stimuli can be provided by external hardware, such as a microphone when testing audio-processing hardware or a camera when testing photo or video processing hardware.

In test environment 100 the simulator is implied and not shown for purposes of clarity of the illustration. The design under test 120 can be based on a behavioral description of a digital hardware design. Such descriptions commonly make use of variables that represent design elements. In design under test 120 these variables are arbitrarily labeled A, B, C, and D. These may represent (multi-bit) registers, latches, signals or any other design element that is part of design under test 120. The test or device that provides stimuli to the design is part of test environment 100, but implied and not shown in FIG. 1A.

The module or entity that determines the result of the test in test environment 100 is the set of predicates 110. Additional or alternative modules or entities for the same purpose are not shown in FIG. 1A. The predicates in the set of predicates 110 are logical formulas that evaluate to true or false. In FIG. 1A, these logical formulas are labeled P0 and P1, but there can be an arbitrary number of these formulas. Each of these formulas is a logical statement about design elements in design under test 120. For illustrative purposes formulas P0 and P1 are statements about variables A, B, C, and D of design under test 120. P0 states that variable A is greater than variable B. P1 states that variable C is greater than variable D. These basic predicates are sometimes referred to as atomic formulas, for example in U.S. patent application Ser. No. 11/672,919.

When a test is executed, the simulator (or a dedicated module or entity that is a part of test environment 100) can monitor or record information about these formulas. For example, these formulas can be evaluated and found to be true or false at any particular time during test execution. This information can be used in the design cycle. The set of predicates 110 can be a part of the design specification. A formula consisting of a set of predicates connected by Boolean operators that is specified to be true under certain conditions is sometimes referred to as an assertion or a design assertion. Assertions are useful and valuable in design verification. Any Boolean combination of basic predicates may also be referred to as a composite predicate. Composite predicates are considered more powerful than basic predicates provided that they are specified to be true under certain conditions.

To improve the quality and speed of the design cycle and the quality of the design it may be beneficial to the user of an electronic design automation system to use more powerful predicates and assertions during the testing process.

SUMMARY OF THE PRESENTLY CLAIMED INVENTION

In accordance with the present invention, systems and methods for deriving predicates and assertions related to a digital hardware design are disclosed. In one embodiment of the present technology described herein, the method includes constructing a logic formula from information recorded during test execution, optimizing the logic formula, and computing the logical implication of the optimized logic formula. A DUT can be described by a hardware design description. The recorded information can include an evaluation of a given set of predicates related to the digital hardware design. The logic formula can be in disjunctive normal form and can include a complete assignment of a set of predicates for a consecutive interval during test execution. The logic formula can be constructed in part by substituting statements about variables for corresponding predicates. Computation of an assertion based on the logic formula can involve the reverse substitution. The constructed logic formula can be reduced in size and complexity by applying mathematical optimization techniques.

Another embodiment of the present technology is a system that derives predicates according to the presented method. The system can include a processor and a memory communicatively coupled with the processor, a construction engine, an optimization engine, and an implication engine. The construction engine can construct a logic formula from information recorded during test execution. The optimization engine can optimize the logic formula. The implication engine can compute a logical implication of the optimized logic formula. In another embodiment of the present technology, the system can include a processor and a memory communicatively coupled with the processor, a substitution engine, one or two insertions engines, and a naming engine. The substitution engine can substitute each predicate in a logic implication with corresponding design elements from a hardware design description. The insertion engine can insert the design elements into a target template. The same insertion engine or a second insertion engine can insert a context-sensitive input of a target template based on design elements in the hardware design description. The naming engine can create an instance name for an instantiation of the target template.

In one more embodiment of the present technology, the system can include a processor and a memory communicatively coupled with the processor, a cube search engine, a cube edit engine, a cube delete engine, and a control engine. The cube search engine can search through a set of cubes that comprise a logic formula in disjunctive normal form (DNF) to find a subset of cubes in which a particular literal appears. The cube edit engine can modify each cube in a set of cubes in a particular way, for example by removing a particular literal (i.e. a Boolean variable or its negation) from all cubes. The cube delete engine can change a set of cubes by deleting a subset of cubes from the set of cubes. The control engine can sequentially and concurrently control the operation of the cube search engine, the cube edit engine, and the cube delete engine to generate clauses that are implied by a set of cubes, wherein a clause is a disjunction of one or more literals.

In another embodiment of the present technology, the method includes substituting each predicate in a logical implication with corresponding statements about design elements from a hardware design description, inserting the design elements into a target template, inserting a context-sensitive input of the target template based on design elements in the hardware design description, and creating an instance name for an instantiation of the target template. The target template can be in SystemVerilog Assertions (SVA) format, or Property Specification Language (PSL) format, or a hardware design language format. A unique instance name can be created by using an md5 encoding of the string that represents the logical implication to create a hash string that is part of the instance name.

Another embodiment of the present technology is a computer readable storage medium that derives assertions according to the presented method.

BRIEF DESCRIPTION OF THE FIGURES

FIG. 2A illustrates an example of information recorded about the state of a set of predicates during test execution.

FIG. 2B illustrates an alternative depiction of information recorded about the state of a set of predicates during test execution.

FIG. 2C illustrates another alternative depiction of information recorded about the state of a set of predicates during test execution.

FIG. 3A illustrates how information recorded about the state of a set of predicates during test execution can be grouped or organized.

FIG. 3B illustrates an exemplary logic formula based on information recorded about the state of a set of predicates during test execution.

FIG. 3C illustrates an exemplary logic formula derived from another logic formula.

FIG. 7 illustrates a flowchart of an exemplary method 700 for generating a template instantiation.

DETAILED DESCRIPTION

Embodiments of the present technology described herein allow for systems and methods for deriving predicates and assertions related to a hardware design description. The test environment 100 in FIG. 1A serves as a starting point for the detailed description of the present technology. The design under test 120 is a given part of a test environment. The test to be executed is also a given part of this environment. The set of predicates 110 is also a given part of this environment. The existing design cycle is augmented by first recording or capturing the state of the set of predicates during test execution. Subsequently, this information is used to generate new and/or composite predicates, which are used in an iteration of the design cycle: the user of the electronic design automation system executes the test anew, to reveal new insights or problems about the state of the DUT and/or the test environment.

Figure 1A:
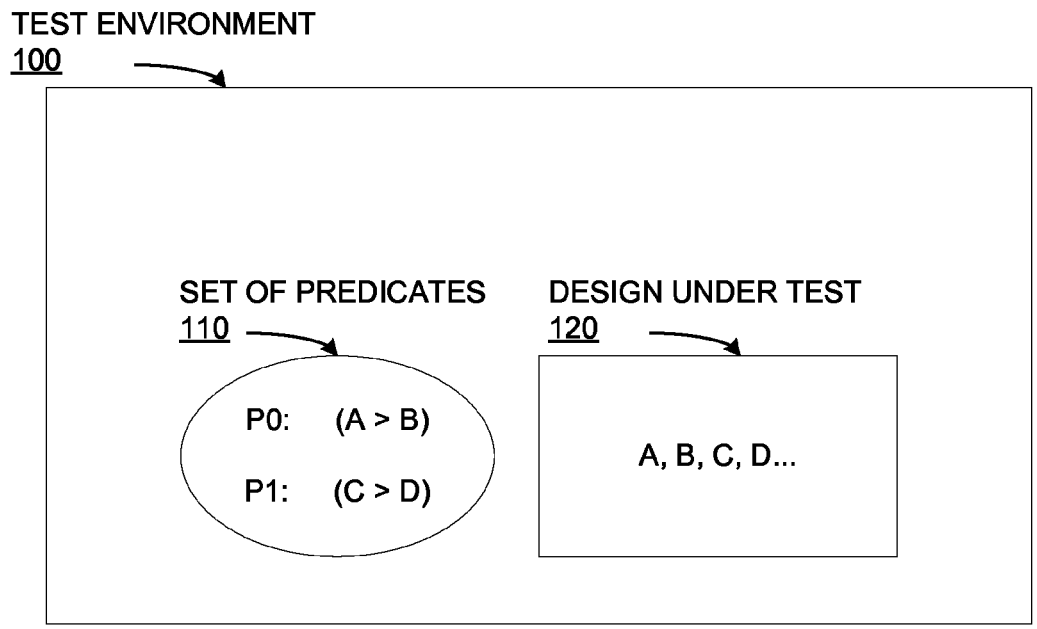
FIG. 1A illustrates a typical test environment as used in an electronic design automation system.
Figure 1B:
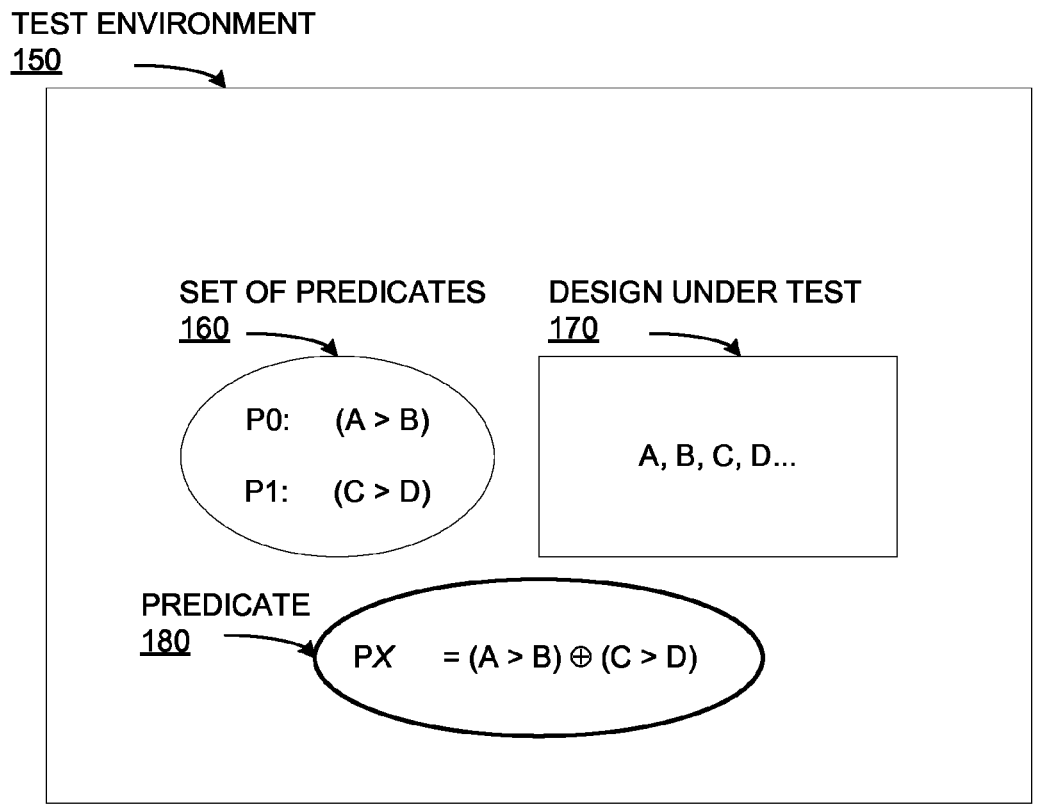
FIG. 1B illustrates a test environment that is augmented by an additional predicate.

FIG. 1B illustrates a test environment 150 that is augmented with respect to the test environment of FIG. 1A by an additional predicate 180, which is derived according to the present technology. Predicate 180 is loaded in a simulator, along with all the modules/components/entities that were loaded in the simulator in test environment 100 in FIG. 1A, after which the test is executed anew. Design under test 170 can be the same as design under test 120 from FIG. 1A. Set of predicates 160 can be the same as set of predicates 110 from FIG. 1A. Test environment 150 is different from test environment 100 from FIG. 1A because it includes newly derived predicate 180. The evaluation of predicate 180 during test execution can provide information that is useful in the design cycle, for example to reveal new insights or problems about the state of the DUT and/or the test environment. Any other modules, components, or entities implied but not shown in FIG. 1A can be part of FIG. 1B without any significant changes.

FIG. 2A illustrates an example of information recorded about the state of a set of predicates during test execution. One way to record information about a predicate is to evaluate a logical formula at constant intervals, for example at every clock edge of a digital clock signal, and store the information in computer memory. Another way to record information is to only record the evaluated value of a logical formula when the value changes. Information 200 in FIG. 2A is an example of recording these changes. At time t=0, predicate P0 evaluated to true. At time t=1, predicate P0 evaluated to false, and so forth. Since no change was recorded for t=4, the value of P0 is assumed to be false at t=4, since it changed to false at the closest prior recorded time: t=3. Similarly, at time t=0, predicate P1 evaluated to false, and so forth. The three dots under P1 indicate there may be more predicates in the set of predicates 110, but these are not depicted in FIG. 2A. The sets of dots to the right of "t=5" indicate that the test executed for an undetermined period after time t=5, but no evaluations for any predicates are depicted for that time period.

FIG. 2B illustrates an alternative depiction of information 210 recorded about the state of a set of predicates during test execution. The same information 200 from FIG. 2A is presented in a different way in FIG. 2B to facilitate an embodiment of the present technology. In the top row, time is depicted linearly, incrementing from left to right. The oldest evaluations are on the left hand side, the newest or latest evaluations are on the right hand side. Again, at time t=0 predicate P0 evaluated to true, at time t=1 it evaluated to false, and so forth. Since no change was recorded for t=4, the assumption is that the value of P0 is false at t=4, since it changed to false at t=3. Similarly, at time t=0 predicate P1 evaluated to false, and so forth. The "x" to the right of the entries for t=5 indicate the value of the predicates is unknown at that time, since no related information was recorded.

FIG. 2C illustrates another alternative depiction of information 220 recorded about the state of a set of predicates during test execution. FIG. 2C illustrates the information 210 from FIG. 2B by replacing the logical values "true" and "false" with digital values 1 and 0, respectively.

FIG. 3A illustrates how information recorded about the state of a set of predicates during test execution can be grouped or organized. By grouping together all of the evaluated values at the same moment in time, it is possible to construct the logic formula depicted in FIG. 3B. Note that FIG. 3A includes additional predicates, from P2 to Pn. It is assumed that recorded information about the state of these predicates during test execution is available, but not depicted in FIG. 3A. Each oval (with a vertical grouping in FIG. 3A) corresponds to a row in FIG. 3B.

FIG. 3B illustrates an exemplary logic formula based on information recorded about the state of a set of predicates during test execution. The object of the logic formula constructed in FIG. 3B is to evaluate as true for at least a minimum threshold period of time of test execution, preferably the entire test. Since P0 is true at t=0 and P1 is false at t=0, the predicate (P0^¬P1) evaluates as true for t=0. Assume that the function that evaluates as true for t=0 for P2 to Pn is called F·t=0·(P2 . . . Pn). The first row of logic formula 310 is then the conjunction of P0 and ¬P1 and F·t=0·(P2 . . . Pn), such that the first row evaluates to true for t=0. Similarly, the second row evaluates to true for t=1, and so forth. Since all the rows evaluate to true and are combined by the logical or function (∨), logic formula 310 evaluates to true. Logic formula 310 is in disjunctive normal form or DNF. A DNF is a disjunction of a set of cubes, where each cube is a conjunction of literals, where a literal is a Boolean variable (e.g. a basic predicate) or its negation.

FIG. 3C illustrates an exemplary logic formula derived from another logic formula. Logic formula 320 is called predicate PX. It is derived from logic formula 310 from FIG. 3B. The logical manipulations used for larger sets of predicates and longer recorded periods of time involve (optionally) reducing logic formula 310 according to well-known principles and optimizing logic formula 310 to facilitate computing the logical implication. Boolean reduction and optimization techniques may include BDD-based and non-BDD based techniques. Logic implication may be determined by a number of techniques, including propositional decision procedure (SAT solver), BDDs, ATPG, or other decision procedures. Standard Boolean mathematical analysis reveals that PX reduces to (P0 xor P1). The logical xor function is depicted with the symbol ⊕. Recall from FIG. 1A and set of predicates 110 how P0 and P1 are defined in terms of statements about variables from DUT 120. The last row in logic formula 320 is derived by substituting predicates for variables. The resulting composite predicate can be the basis for an appropriately-formatted assertion and used in FIG. 1B as predicate 180. In some embodiments, reducing may result in a logically equivalent, but represented smaller. Optimizing may include reduction, but can additionally involve removing terms deemed to be of low importance, so the result of an optimization is not necessarily logically equivalent.

Figure 4:
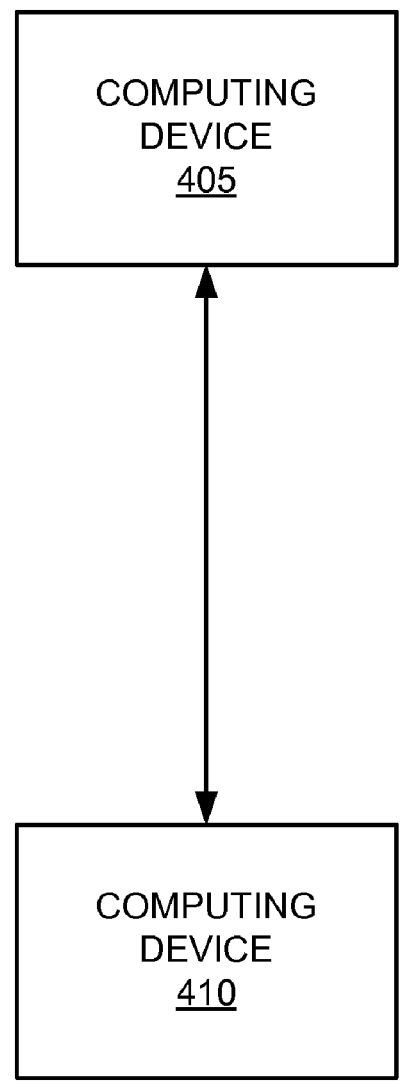
FIG. 4 illustrates an exemplary embodiment of a system for deriving predicates and assertions in accordance with the technology presented herein.
Figure 5A:
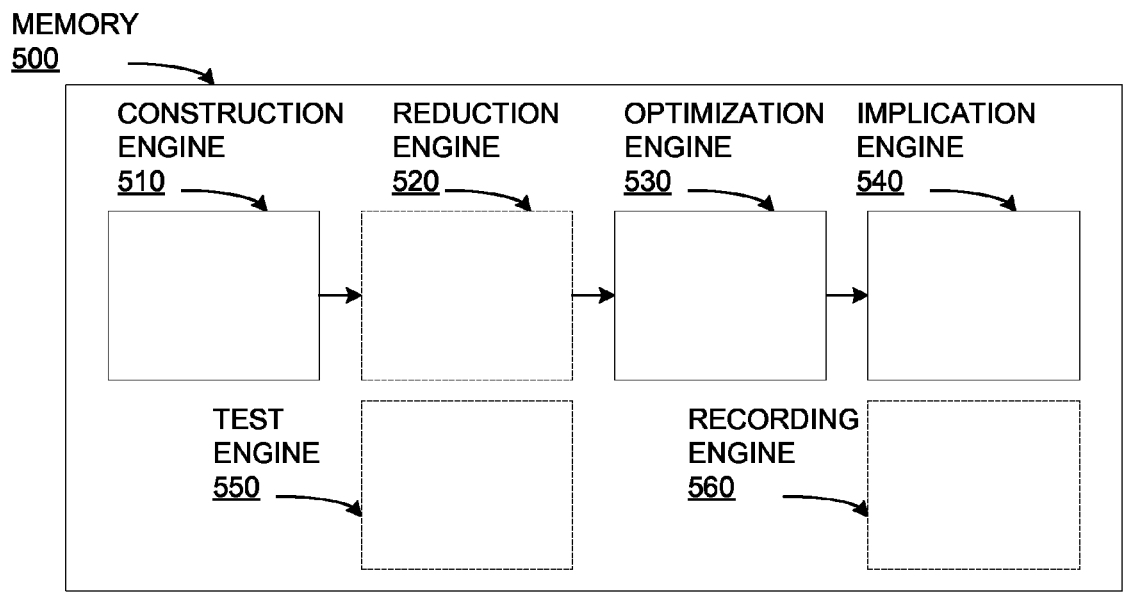
FIG. 5A illustrates exemplary software modules stored in computer memory.
Figure 5B:
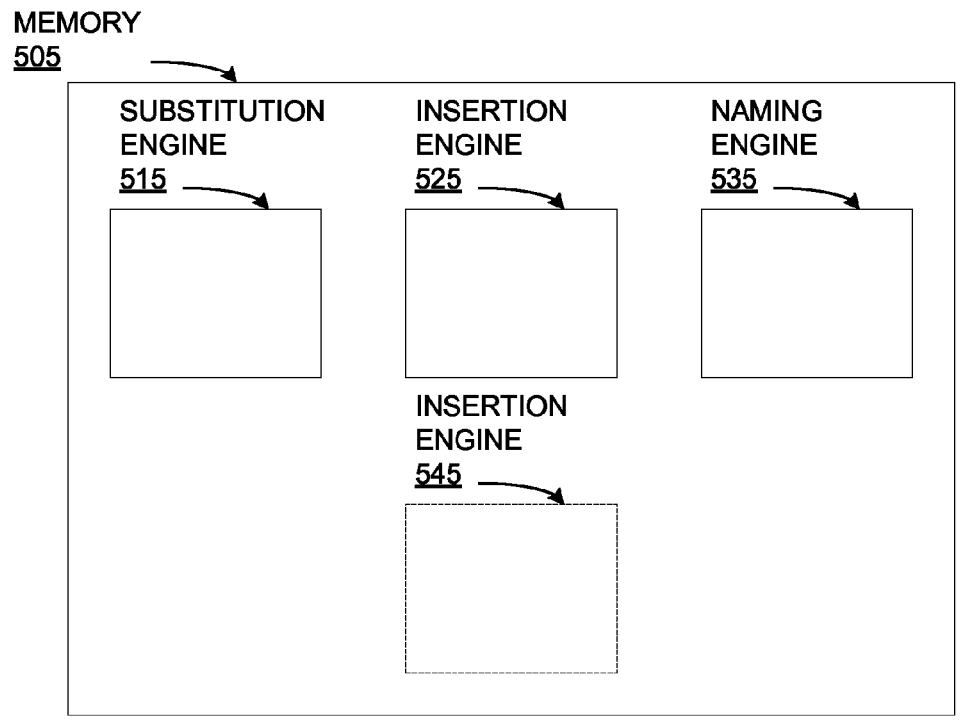
FIG. 5B illustrates exemplary software modules stored in computer memory.
Figure 5C:
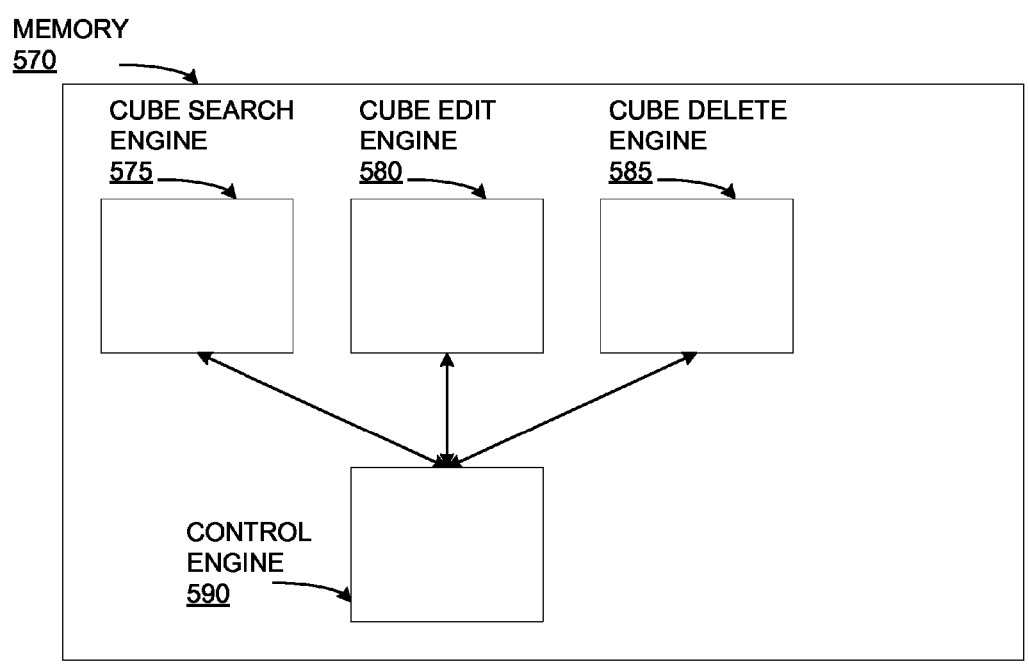
FIG. 5C illustrates exemplary software modules stored in computer memory.

FIG. 4 illustrates an exemplary embodiment of a system for deriving (composite) predicates and assertions in accordance with the present technology. The system includes a first computing device 405 and a second computing device 410, communicatively coupled with each other. The computing devices 405 and 410 may be coupled through a network, through a bus on an integrated circuit containing both devices, or through some other means. The integrated circuit may contain a processor, memory, and communication bus for both devices. Alternatively, any or all of these elements may be separate devices and located on a separate physical or logical machine. For example, memory of computing device 405 may be accessed remotely through a network by a processor of computing device 410. Each of computing devices 405 and 410 may include memory having one or more execution engines in accordance with embodiments of the present technology. FIGS. 5A, 5B, and 5C provide more details regarding executable engines contents, and the computing device is discussed in more detail below with respect to FIG. 9.

FIG. 5A illustrates exemplary software modules stored in computer memory. The modules include construction engine 510, an optional reduction engine 520, an optimization engine 530 and an implication engine 540. The modules can additionally include a test engine 550 and a recording engine 560. Optional test engine 550 is operated to execute tests in a manner similar to the mariner described in relation to test environment 100 in FIG. 1A. A hardware design description can also be included in memory 500, though not depicted in FIG. 5A. Optional recording engine 560 is executed to record information during test execution and store the information in memory. Construction engine 510 is executed to construct a logic formula from information recorded during test execution. Reduction engine 520 is optionally executed to reduce the logic formula. Optimization engine 530 is executed to optimize the logic formula. Implication engine 540 is executed to compute the logical implication of the optimized logic formula.

FIG. 5B illustrates exemplary software modules stored in computer memory. The modules include a substitution engine 515, an insertion engine 525, a naming engine 535, and an optional insertion engine 545. Substitution engine 515 is executed to substitute each predicate in a logic implication with corresponding design elements from a hardware design description, which is stored elsewhere in memory 505, though not depicted in FIG. 5B. Insertion engine 525 is executed to insert the design elements into a target template. Either insertion engine 525 or optional insertion engine 545 is executed to insert a context-sensitive input of a target template based on design elements in the hardware design description. An example of a context-sensitive input of a target template is a clock input. Based on the hardware design, not all clocks may be appropriate to use in relation to the design elements that are included in the assertion. Naming engine 535 is executed to create an instance name for an instantiation of the target template.

FIG. 5C illustrates exemplary software modules stored in computer memory. The modules include a cube search engine 575, a cube edit engine 580, a cube delete engine 585, and a control engine 590. The control engine 590 is executed to control a process using the afore-mentioned engines to generate an implication of a logic formula in disjunctive normal form or DNF. The DNF can be considered as a set of cubes. The generated implication is a conjunction of one or more clauses, where each clause is a disjunction of one or more literals (i.e. a Boolean variable or its negation). The size of a clause may be the number of literals it contains. To generate all clauses of size less than or equal to a selected number M, the control engine 590 first uses the cube search engine 575 to search through the set of cubes for certain literals. For any literals that appear in at least 1/M cubes, while M is not zero, the control engine 590 selects one literal and uses the cube delete engine 585 to remove all cubes that contains the selected literal from the set of cubes. Else, all selected literals so far are gathered by the control engine 590 as one clause. Then the control engine directs the cube edit engine 580 to modify the remaining cubes by removing the negation from the selected literal from all cubes. Next, the control engine 590 is executed to perform the same process for a clause less than or equal to M−1 that is implied by the remaining cubes. If the cube search engine 575 cannot find at least 1/M cubes in which the selected literal appears, another literal is selected instead, until all literals are exhausted. Finally, the control engine 590 collects all generated clauses as a conjunction that is implied by the DNF.

Figure 6:
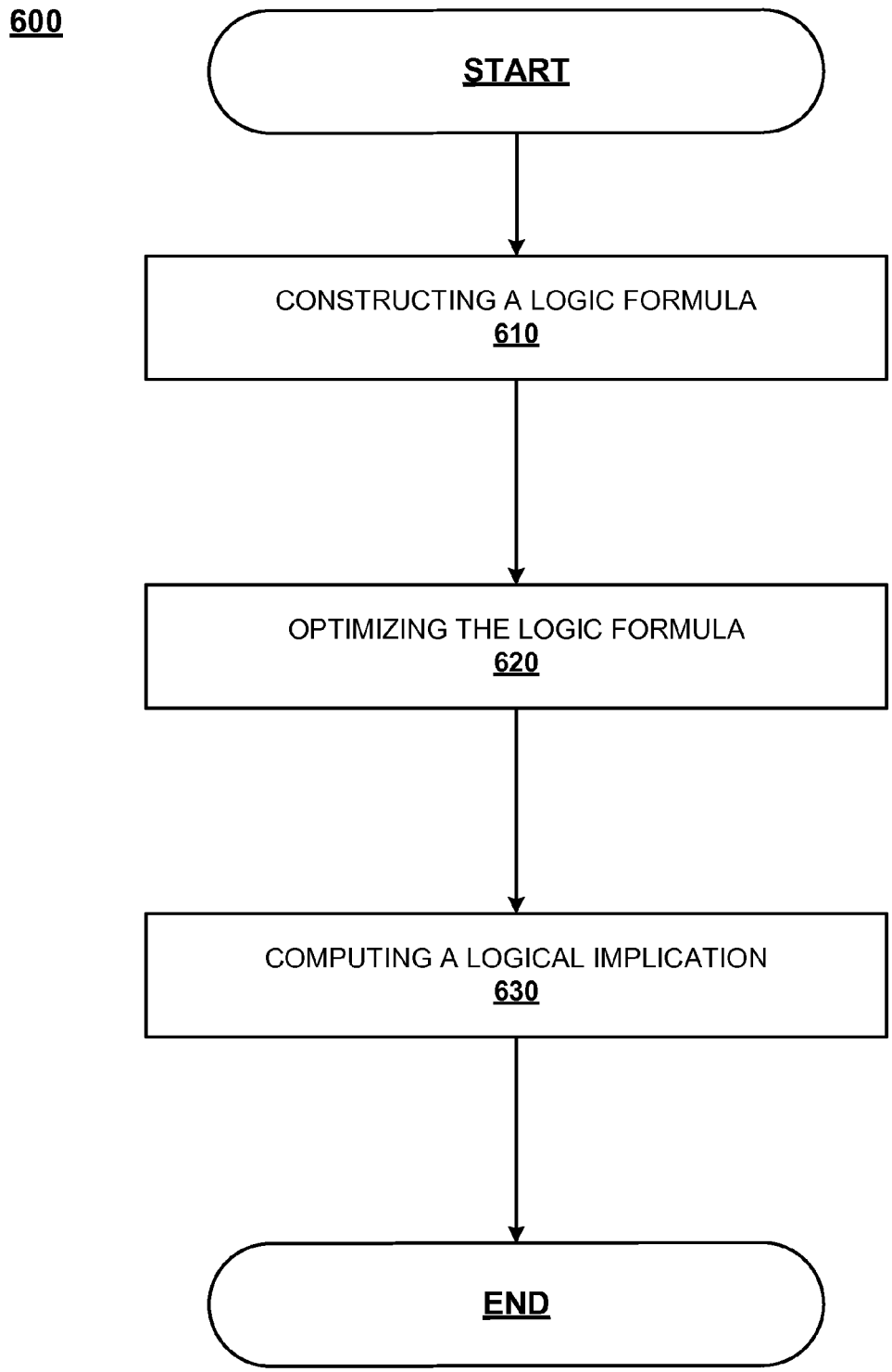
FIG. 6 illustrates a flowchart of a method according to an embodiment of the present technology.

FIG. 6 illustrates a flowchart of a method 600 according to an embodiment of the present technology. In step 610, a construction engine 510 is executed to construct a logic formula from information recorded during test execution. The construction engine 510 constructs the logic formula such as that illustrated in FIG. 3B. In step 620 an optimization engine 530 is executed to optimize the logic formula. In step 630 an implication engine 540 is executed to compute a logic implication of the optimized logic formula as that illustrated in FIG. 3C. Method 600 ends at the step labeled "END".

FIG. 7 illustrates a flowchart of an exemplary method 700 for generating a template instantiation. In step 710 a substitution engine 515 substitutes each predicate with design elements from a hardware design description. For example, the hardware design description may be design under test 120 as illustrated in FIG. 1A. The design elements may be variables A, B, C, and D as illustrated in FIG. 1A. In step 720 an insertion engine 525 inserts the design elements into a target template. In step 730 insertion engine 525 or insertion engine 545 inserts a context-sensitive input of the target template based on design elements in the hardware design description. In step 740 a naming engine 535 is executed to create an instance name for an instantiation of the target template. An example of an instance name may be "PX" as illustrated in FIG. 3C and FIG. 1B. Method 700 ends at the step labeled "END".

Figure 8:
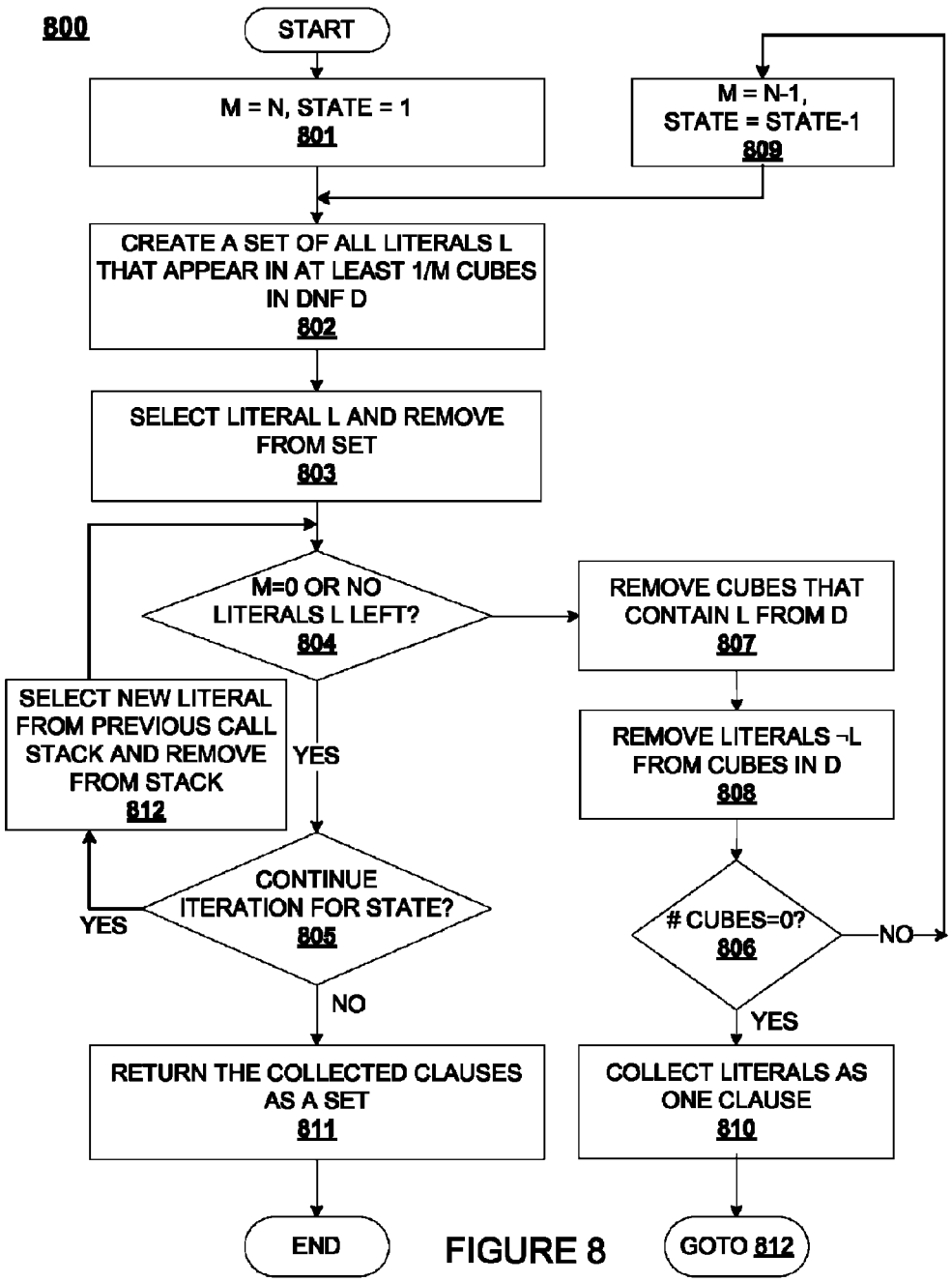
FIG. 8 illustrates a flow chart of an exemplary method for generating clauses.

FIG. 8 illustrates a flow chart of an exemplary method for generating clauses. The engines of FIG. 5C may be used to implement the method illustrated in FIG. 8. The clauses may be of size less than or equal to a selected number M that are implied by a DNF formula. Logic formula 310 in FIG. 3B is an example of a DNF. In one embodiment, the following process is used to generate all clauses of size less than or equal to M that are implied by a DNF formula d. By repeatedly performing this process for a range of values of M, all clauses that are implied by DNF d are generated.

At step 801 M is set to N and a state is set to an initial state such as 1. The number N may be any number. A set of all literals L that appears in at least 1/M cubes in d are created at step 802. This may be performed by invoking cube search engine 575 repeatedly. A literal L is selected and removed from the created set at step 803. In some embodiments, a literal can be selected at random, in an order of appearance, or based on other criteria.

A determination is made as to whether M=0 or there are no literals L within the set at step 804. If M does not equal zero and there are literals left in the set, the method continues to step 807. If M equals zero or no literals L exist in the set, a determination is made as to whether the iteration should continue for the current state at step 805. The current iteration may continue if, for example, the previous call stack is not empty. If the current iteration should not continue, the generated clauses are returned as a set at step 811 and the method ends. If the current iteration should continue at step 805, a new literal is selected from a previous call stack, the new literal is removed from the stack and the method of FIG. 8 continues to step 804, thereby backtracking within the current iteration.

If M is not equal to zero and there are literals within the set, the method of FIG. 8 continues to step 807 where cubes that contain the selected literal L from DNF d are removed. Removing cubes may be performed by cube delete engine 585. Next, all literals ¬L (i.e., not having L) are removed from all cubes in d at step 808, e.g. by using cube edit engine 580 and then a determination is made as to whether the number of cubes is equal to zero at step 806. If the total number of cubes equals 0, the control engine 590 collects all picked literals as one clause at step 810 and the method continues to step 812. Otherwise, the method of FIG. 8 continues to step 809

At step 809, M is decremented from N to N−1 and the state is incremented. The method of FIG. 8 then continues to step 802 for another iteration of potentially removing literals, collecting a clause or removing a cube. Hence, the next iteration may involve a backtrack, during which control of the process returns to the previous call stack, a new literal L is selected, and the steps starting from 802 are repeated. If, in some embodiments, the call stack is empty after a back track, i.e. at the top level of the process, the process exits and control engine 590 returns the set of all collected clauses as a result.

Figure 9:
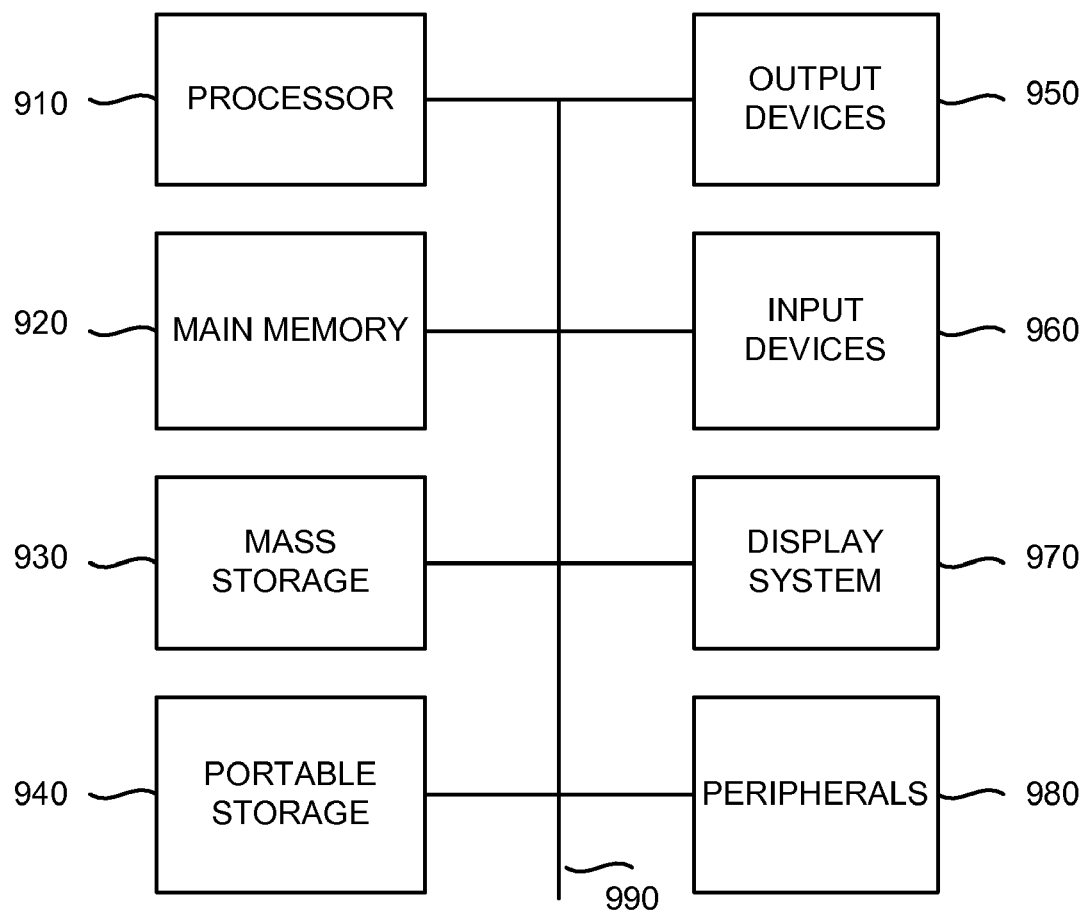
FIG. 9 illustrates a block diagram of an exemplary computing device.

FIG. 9 is a block diagram of exemplary computing system/device 900. In some embodiments, the exemplary computing system/device 900 may be used to implement each of one or more computing devices used to perform tests, generate predicates and generate assertions, such as, for example computing devices 405 and 410 of FIG. 4.

The computing system 900 of FIG. 9 includes one or more processors 910 and main memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a floppy disk, compact disk or digital video disc, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Examples of suitable output devices include speakers, printers, network interfaces, and monitors.

Display system 970 may include a CRT, a liquid crystal display (LCD) or other suitable display device. Display system 970 receives textual and graphical information, and processes the information for output to the display device.

Peripherals 980 may include any type of computer support device to add additional functionality to the computer system. For example, peripheral device(s) 980 may include a modem or a router.

The components contained in the computer system 900 of FIG. 9 are those typically found in computer systems that may be suitable for use with embodiments of the present technology and are intended to represent a broad category of such computer components that are well known in the art. Thus, the computer system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

It is noteworthy that any hardware platform suitable for performing the processing described herein is suitable for use with the presented technology. Computer-readable storage media refer to any medium or media that participate in providing instructions to a central processing unit (CPU), a processor, a microcontroller, or the like. Such media can take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

The embodiments disclosed herein are illustrative. Various modifications or adaptations of the systems and methods described herein can become apparent to those skilled in the art. Such modifications, adaptations, and/or variations that rely upon the teachings of the present disclosure and through which these teachings have advanced the art are considered to be within the spirit and scope of the present invention. Hence, the descriptions and drawings herein should be limited by reference to the specific limitations set forth in the claims appended hereto.

What is claimed is:

1. A computer-implemented method for deriving a predicate, the method comprising:
constructing a logic formula by executing a construction engine stored in memory, the logic formula constructed from information recorded during test execution;
optimizing the logic formula by executing an optimization engine stored in memory; and
computing a logical implication by executing an implication engine stored in memory, the logical implication computed of the optimized logic formula.

2. The computer-implemented method of claim 1, wherein the subject of the test is a hardware design description.

3. The computer-implemented method of claim 2, wherein the recorded information comprises an evaluation of a set of predicates related to the hardware design description.

4. The computer-implemented method of claim 3, wherein the logic formula includes a complete assignment of the set of predicates for a consecutive interval during test execution.

5. The computer-implemented method of claim 3, wherein the constructing step includes substituting Boolean variables for predicates.

6. The computer-implemented method of claim 5, wherein the logic formula is reduced by a reduction engine stored in memory, prior to the optimizing step.

7. The computer-implemented method of claim 5, wherein the computing step includes substituting predicates of the logical implication for Boolean variables.

8. The computer-implemented method of claim 2, wherein the test is executed in a cycle-based simulation environment.

9. The computer-implemented method of claim 2, wherein the test is executed in an event-based simulation environment.

10. The computer-implemented method of claim 1, wherein the logic formula is in disjunctive normal form.

11. The computer-implemented method of claim 1, wherein the logical implication is in conjunctive normal form.

12. A computer-implemented method for deriving an assertion from a logical implication, comprising:
substituting each predicate in the logical implication with corresponding design elements from a hardware design description by executing a substitution engine stored in memory;
inserting the design elements into a target template by executing an insertion engine stored in memory;
inserting at least one context-sensitive input of the target template based on design elements in the hardware design description by executing an insertion engine stored in memory; and
creating an instance name for an instantiation of the target template by executing a naming engine stored in memory.

13. The computer-implemented method of claim 12, wherein the target template is in SystemVerilog Assertions (SVA) format.

14. The computer-implemented method of claim 12, wherein the target template is in Property Specification Language (PSL) format.

15. The computer-implemented method of claim 12, wherein the target template is in a hardware description language.

16. The computer-implemented method of claim 12, wherein the creating step uses an md5 encoding of the string that represents the logical implication to create a unique hash string that is part of the instance name.

17. A non-transitory computer readable storage medium having embodied thereon a program, the program being executable by a processor to perform a method for deriving a predicate, the method comprising:

constructing a logic formula from information recorded during test execution;

optimizing the logic formula; and computing a logical implication of the optimized logic formula.

18. The non-transitory computer readable storage medium of claim 17, wherein the subject of the test is a hardware design description.

19. The non-transitory computer readable storage medium of claim 18, wherein the recorded information comprises an evaluation of a set of predicates related to the hardware design description.

20. The non-transitory computer readable storage medium of claim 19, wherein the construction of the logic formula includes substituting Boolean variables for predicates.

21. A non-transitory computer readable storage medium having embodied thereon a program, the program being executable by a processor to perform a method for deriving an assertion from a logical implication, comprising:

substituting each predicate in the logical implication with corresponding design elements from a hardware design description;

inserting the design elements into a target template;

inserting at least one context-sensitive input of the target template based on design elements in the hardware design description; and creating an instance name for an instantiation of the target template.

22. The non-transitory computer readable storage medium of claim 21, wherein the target template is in SystemVerilog Assertions (SVA) format.

23. The non-transitory computer readable storage medium of claim 21, wherein the target template is in a hardware description language.

24. A system for deriving a predicate, the system comprising:

a processor;

a network;

a memory communicatively coupled with the processor through the network;

a construction engine stored in the memory and configured to be executed by the processor to construct a logic formula from information recorded during test execution;

an optimization engine stored in the memory and configured to be executed by the processor to optimize the logic formula; and an implication engine stored in the memory and configured to be executed by the processor to compute a logical implication of the optimized logic formula.

25. The system of claim 24, further comprising a test engine configured to execute at least one test on a hardware design description.

26. The system of claim 25, further comprising a recording engine configured to record information during test execution.

27. A computer-implemented recursive method for generating a set of clauses, the clauses having a size less than or equal to a selected number M, wherein the clauses are implied by a disjunctive normal formula of a set of cubes, the method comprising:

creating a set of all literals L that appear in at least 1/M cubes in the disjunctive normal formula;

for each literal L in the set of literals, perform the following three steps recursively:

remove all cubes that contain literal L from the disjunctive normal formula of a set of cubes, remove all literals L from all cubes in the disjunctive normal formula of a set of cubes, and generate a set of clauses of size less than or equal to M−1 that is implied by the disjunctive normal formula of the remaining set of cubes;

collecting all picked literals as one clause if the total number of cubes in the set of cubes equals zero; and;

collecting the generated clauses into a set.

28. A system for generating a set of clauses that are implied by a disjunctive normal formula of a set of cubes, the system comprising:

a processor;

a network;

a memory communicatively coupled with the processor through the network;

a cube search engine stored in the memory and configured to be executed by the processor to search through a set of cubes for a set of all literals that appear in at least 1/M cubes in the set of cubes;

a cube delete engine stored in the memory and configured to be executed by the processor to remove all cubes that contain a selected literal from a set of cubes;

a cube edit engine stored in the memory and configured to be executed by the processor to remove the negation of a selected literal from the cubes in a set of cubes;

and a control engine stored in the memory and configured to be executed by the processor to:

control a recursive process to generate all clauses of size less than or equal to a selected number M that are implied by a disjunctive normal formula of a set of cubes, select a literal from the set of literals returned by the cube search engine, invoke the cube delete engine and cube edit engine until the set of cubes is empty, recursively invoke the control engine to generate all clauses of size less than or equal to a selected number M−1 that are implied by a disjunctive normal formula of a set of cubes, until M is equal to zero, collect the selected literals into a clause if the set of cubes is empty, and collect the generated clauses into a set if the set of literals is empty.

29. A computer-implemented method for constructing a predicate, the method comprising:

executing a test by executing a test engine stored in memory;

recording information during test execution by executing a recording engine;

constructing a predicate by executing a construction engine stored in memory, the logic formula constructed based on information recorded during test execution.

* * * * *